(12) United States Patent
Stienhans

(10) Patent No.: US 7,958,216 B2
(45) Date of Patent: Jun. 7, 2011

(54) METHOD FOR IMPLEMENTING AN UNPLANNED SHUTDOWN OF A COMPUTER SYSTEM

(75) Inventor: Frank Stienhans, Mannheim (DE)

(73) Assignee: SAP AG, Walldorf (DE)

( * ) Notice: Subject to any disclaimer, the term of this patent is extended or adjusted under 35 U.S.C. 154(b) by 518 days.

(21) Appl. No.: 11/394,222

(22) Filed: Mar. 31, 2006

(65) Prior Publication Data

US 2007/0233803 A1 Oct. 4, 2007

(51) Int. Cl.
*G06F 15/173* (2006.01)
(52) U.S. Cl. ........ 709/223; 709/205; 715/700; 715/733; 715/753; 715/759; 715/809
(58) Field of Classification Search .......... 709/223–227, 709/201–204, 200; 705/8–10; 706/45; 713/1–2; 715/700, 716–717, 733–737, 753, 759, 809
See application file for complete search history.

(56) References Cited

U.S. PATENT DOCUMENTS

| | | | | |
|---|---|---|---|---|
| 5,193,143 A * | 3/1993 | Kaemmerer et al. | ........... | 706/45 |
| 5,388,189 A * | 2/1995 | Kung | .............. | 706/45 |
| 5,557,747 A * | 9/1996 | Rogers et al. | ................. | 709/223 |
| 5,684,992 A * | 11/1997 | Abrams et al. | ................ | 719/314 |
| 5,737,530 A * | 4/1998 | Kukkal et al. | ................. | 709/204 |
| 5,764,974 A * | 6/1998 | Walster et al. | .................... | 707/6 |
| 5,893,098 A * | 4/1999 | Peters et al. | .................... | 707/10 |
| 6,553,369 B1 * | 4/2003 | Guay et al. | ........................ | 707/3 |
| 6,957,363 B2 * | 10/2005 | Spiegel | .......................... | 714/24 |
| 7,065,184 B2 * | 6/2006 | Vishik et al. | ............... | 379/88.02 |
| 7,124,119 B2 * | 10/2006 | Bigus et al. | .................... | 706/10 |
| 7,149,889 B2 * | 12/2006 | Stalker et al. | .................... | 713/2 |
| 7,269,569 B2 * | 9/2007 | Spira et al. | ........................ | 705/7 |
| 2003/0036939 A1 * | 2/2003 | Flores et al. | ...................... | 705/8 |
| 2003/0084276 A1 * | 5/2003 | Levidow et al. | .................. | 713/1 |
| 2003/0182177 A1 * | 9/2003 | Gallagher et al. | ............. | 705/10 |
| 2004/0205034 A1 * | 10/2004 | Bigus et al. | .................... | 706/10 |
| 2004/0230687 A1 * | 11/2004 | Nakamura et al. | ............ | 709/228 |
| 2007/0150815 A1 * | 6/2007 | Smith et al. | ................... | 715/733 |

\* cited by examiner

*Primary Examiner* — William C. Vaughn, Jr.
*Assistant Examiner* — Greg Bengzon
(74) *Attorney, Agent, or Firm* — Mintz, Levin, Cohn, Ferris, Glovsky & Popeo, P.C.

(57) ABSTRACT

Methods, systems, and computer-readable media are provided for managing system actions on a network. In one exemplary embodiment, there is provided a method for managing system actions on a computer network, comprising the steps of initiating a system action sequence in response to a received command, transmitting information about the system action sequence to one or more user computers or administrator computers, receiving feedback information about the system action sequence from one or more user computers or administrator computers, and selectively performing one of continuing the system action sequence, canceling the system action sequence, or reinitiating the system action sequence at a later time, based on the feedback information.

20 Claims, 7 Drawing Sheets

METHOD FOR IMPLEMENTING AN UNPLANNED SHUTDOWN OF A COMPUTER SYSTEM

I. BACKGROUND

A. Technical Field

The present invention generally relates to computer systems and, more particularly, for methods of implementing system actions such as shutdowns of computers on a network.

B. Detailed Background

Computers are often connected with other computers via a network in both home and work environments. Computers on the network are often managed by one or more administrators. Occasionally, some or all of the computers on a given network will need various system actions, such as a shutdown. A shutdown can be required for various reasons, such as maintenance, replacement, software updates, or hardware updates. Ideally, shutdowns can be planned beforehand, so there is an opportunity to consider when and how to best implement the shutdown. However, not all shutdowns can be planned with enough lead time to ensure that the shutdown goes smoothly for users of computers on the network.

For example, sometimes a critical virus software update will become available that is of sufficiently high priority to justify shutting down some or all of the computers on the network. In this case, an unplanned shutdown may be necessary so the computers can be scanned for harmful software. Other hardware or software updates may also be time-sensitive, depending upon the needs of the people using the computers on the network.

Implementing a time-sensitive shutdown immediately may not be the best approach in every case, however. Some users may have unsaved data, be near completion of an important task, or may be engaged in important communications using the computer, such as chat software, voice-over IP, etc. In addition there may be long-running processes, such as completing a large software build or simulation, that take weeks or even months to finish. In these circumstances it is often undesirable for the administrator to implement the shutdown immediately.

In many cases, a shutdown is initiated, and the users are simply notified of the shutdown via an email, by word of mouth, or even by their computer beginning to shut down as they work. If a user desires to inform the administrator that the shutdown should be reinitiated later or canceled, the user may contact the administrator by telephone, email, fax, etc. However, the user may not be able to inform the administrator in time to prevent the shutdown. In addition, the users may have difficulty contacting the administrator, as the administrator may be too busy to read all of the emails, answer the phone calls, etc. Also, the administrator may try to shut down the system multiple times, and each time some user may request the shutdown be delayed, causing the administrator unnecessary inconvenience.

It is desirable to provide an automated interface which allows users to provide feedback to an administrator who wishes to implement a shutdown on a computer network. It is further desirable to allow users an opportunity to vote on whether to implement the shutdown at a particular time, and to allow the administrator to assess the needs of the users on the network from the administrator's computer, taking into account such information as the number of users who wish to continue working, the number of computers with unsaved data, the number of computers with applications currently running, and other information which the users communicate to the administrator.

II. SUMMARY

Consistent with the invention, there is provided methods and apparatus for managing system actions on a computer network having at least a first computer and a plurality of second computers, the method comprising the steps of initiating a system action sequence in response to a received command, transmitting information about the system action sequence to the second computers, receiving feedback information about the system action sequence from the second computers, and selectively performing one of continuing the system action sequence, canceling the system action sequence, or reinitiating the system action sequence at a later time, based on the feedback information.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

III. BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings, FIG. 1 illustrates a block diagram of an exemplary computer network and a block diagram of an exemplary administrator computer consistent with certain aspects related to the present invention.

IV. DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
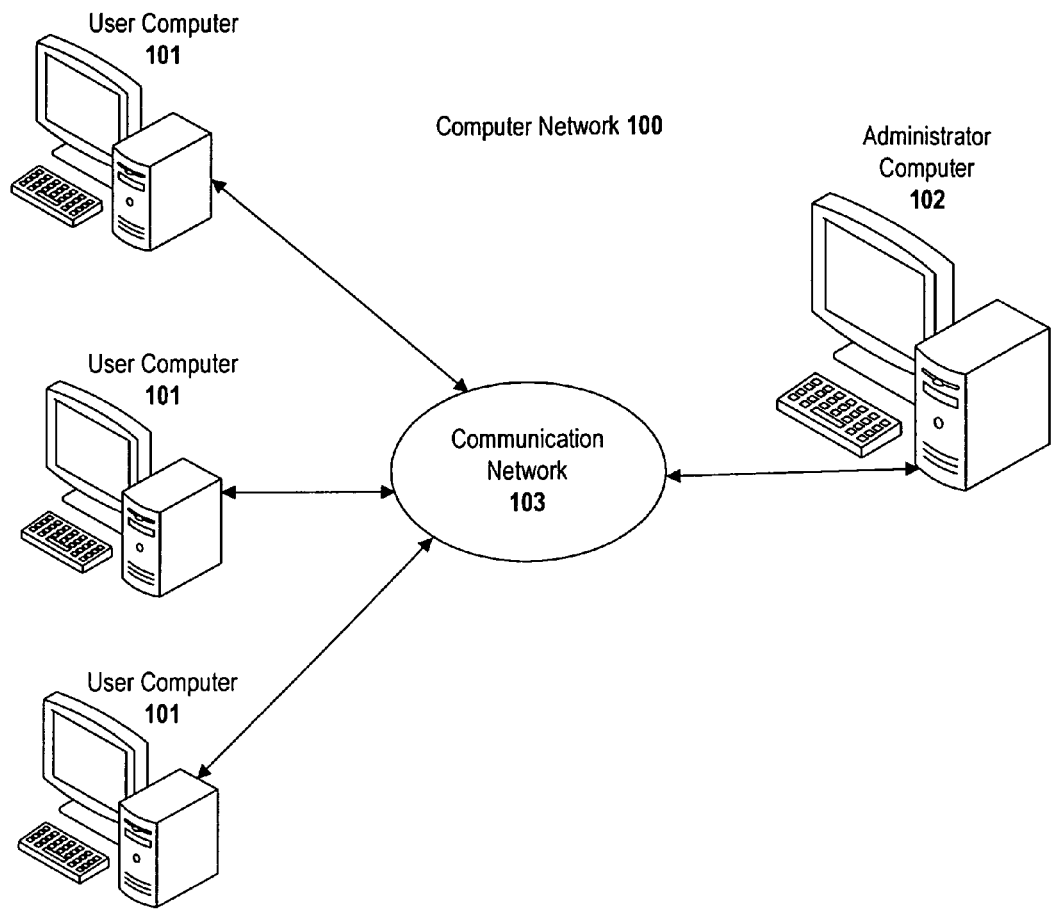
Figure 1:
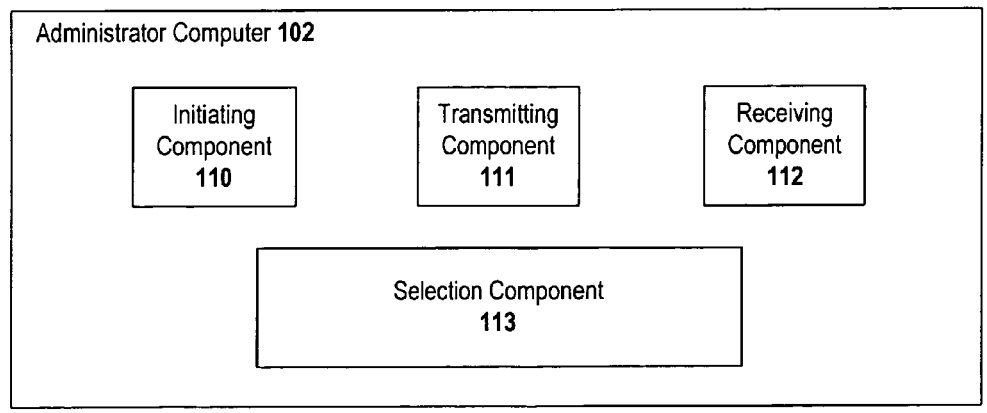

FIG. 1 includes a block diagram of an exemplary computer network 100. Computer network 100 may include one or more user computers 101, an administrator computer 102, and a communication network 103. User computers 101 and administrator computer 102 may include one or more processors, storage devices, applications, and other hardware or software. Communication network 103, which can be implemented by wired or wireless technologies, allows user computers 101 and administrator computer 102 to communicate. Communication network 103 can be virtually any type of network, including a WAN such as the internet, or a home or office-based LAN.

For the purposes of this description, an "administrator" is a person with permission to initiate a shutdown. A "user" is someone who does not have permission to initiate a shutdown. An "administrator computer" is a computer with an administrator logged in. A "user computer" is any computer that is not an administrator computer.

Preferably, computer network 100 includes a minimum of 2 computers, and a minimum of 1 administrator computer 102. There is no minimum number of user computers 101.

FIG. 1 also illustrates a block diagram of administrator computer 102. Administrator computer 102 includes an initiating component 110, a transmitting component 111, a receiving component 112, and a selection component 113. Initiating component 110 is used for initiating a system action sequence in response to a received command. Transmitting component 111 is used to transmit information about the system action sequence to user computers 101. Receiving component 112 is used for receiving feedback information about the system action sequence from user computers 101. Selection component 113 is used to selectively perform one of continuing the system action sequence, canceling the system action sequence, or reinitiating the system action sequence.

Figure 2:
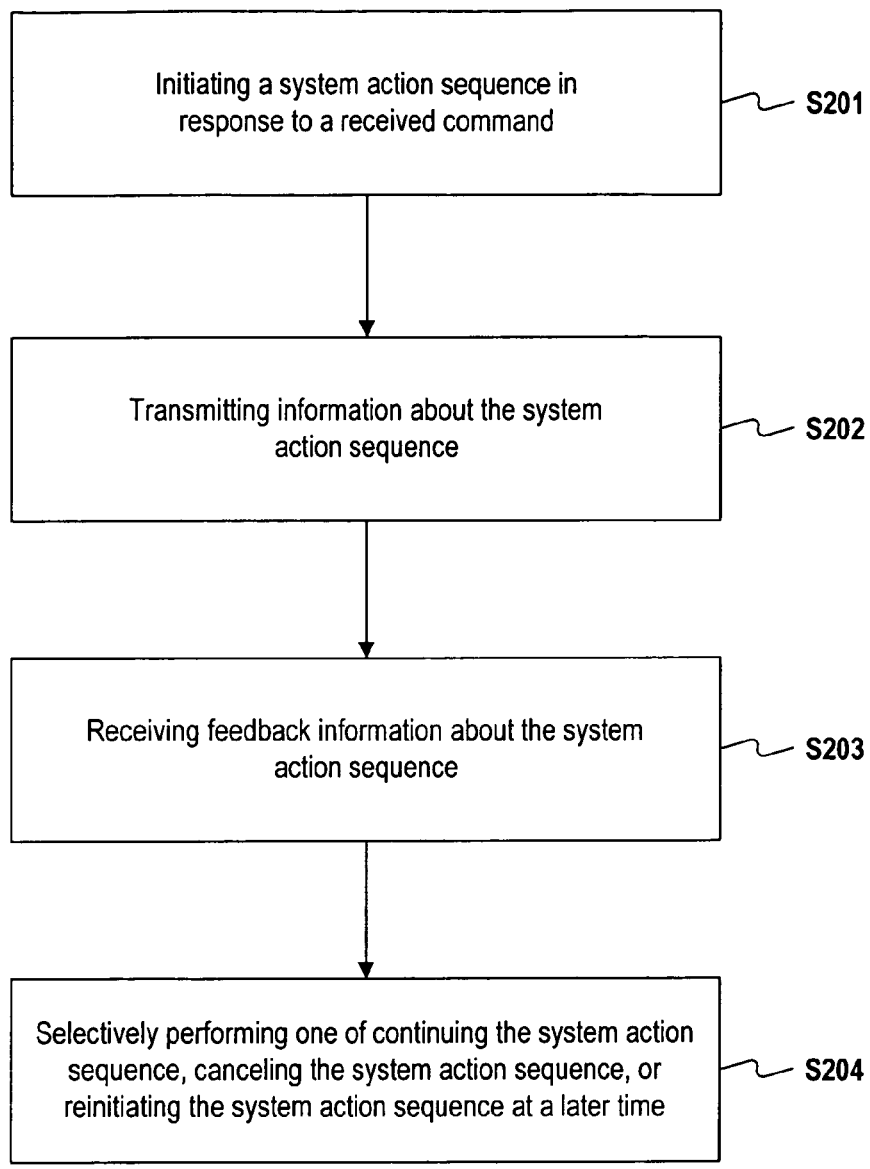
FIG. 2 illustrates an exemplary flowchart for describing steps in a shutdown sequence consistent with certain aspects related to the present invention.

FIG. 2 is an exemplary flowchart 200 of a method consistent with the invention. Flowchart 200 illustrates a method for managing system actions on a computer network. A system action can be, for example, a shutdown, a software or hardware upgrade, or other changes that affect multiple computers on the network.

At step S201, administrator computer 102 initiates a system action sequence, such as a shutdown sequence, in response to a received command, and sends information about the shutdown sequence to user computers 101. At step S202, the administrator computer transmits information about the system action sequence to one or more user computers 102 on the network.

At step S203, feedback is received by the administrator computer 102 from the user computers 101. The administrator computer 102 displays the feedback to an administrator, so the administrator can decide how to proceed with the system action sequence. At step S204, administrator computer 102 either continues the originally scheduled system action sequence, reinitiates the system action sequence at another time, or cancels the system action sequence altogether.

Figure 3:
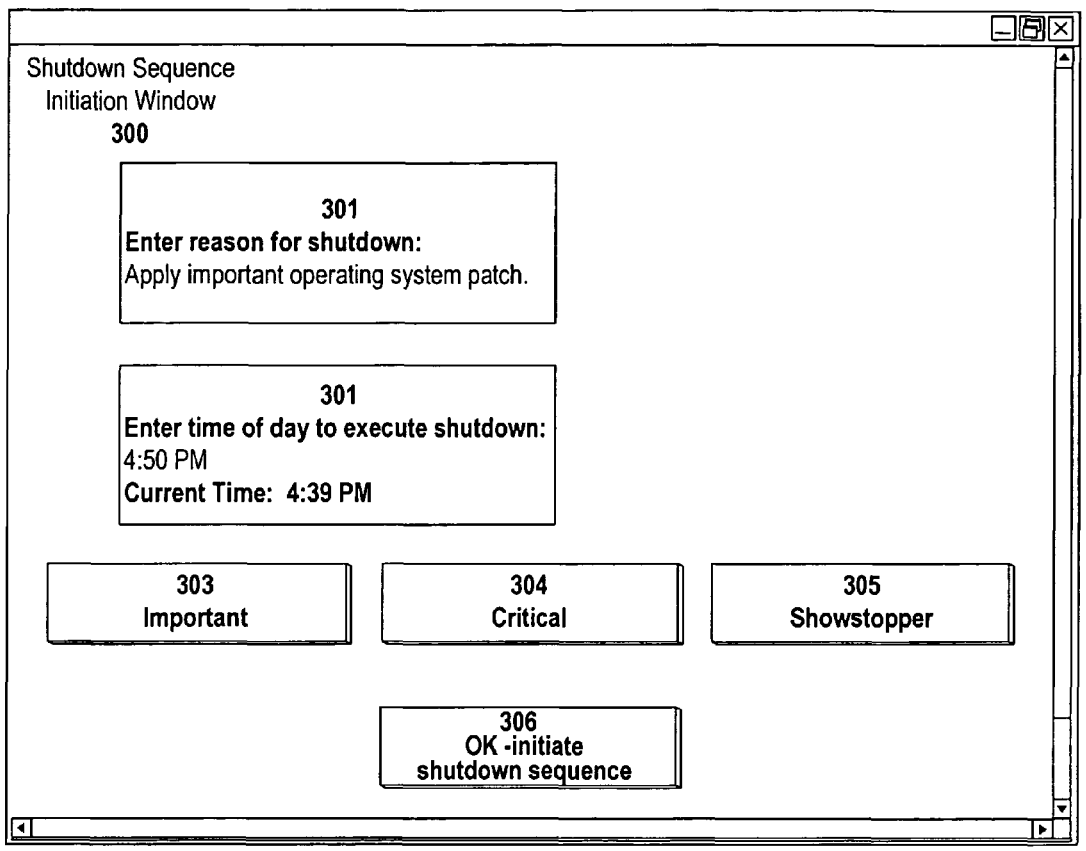
FIG. 3 illustrates a block diagram of an exemplary shutdown sequence initiation window consistent with certain aspects related to the present invention.
Figure 5:
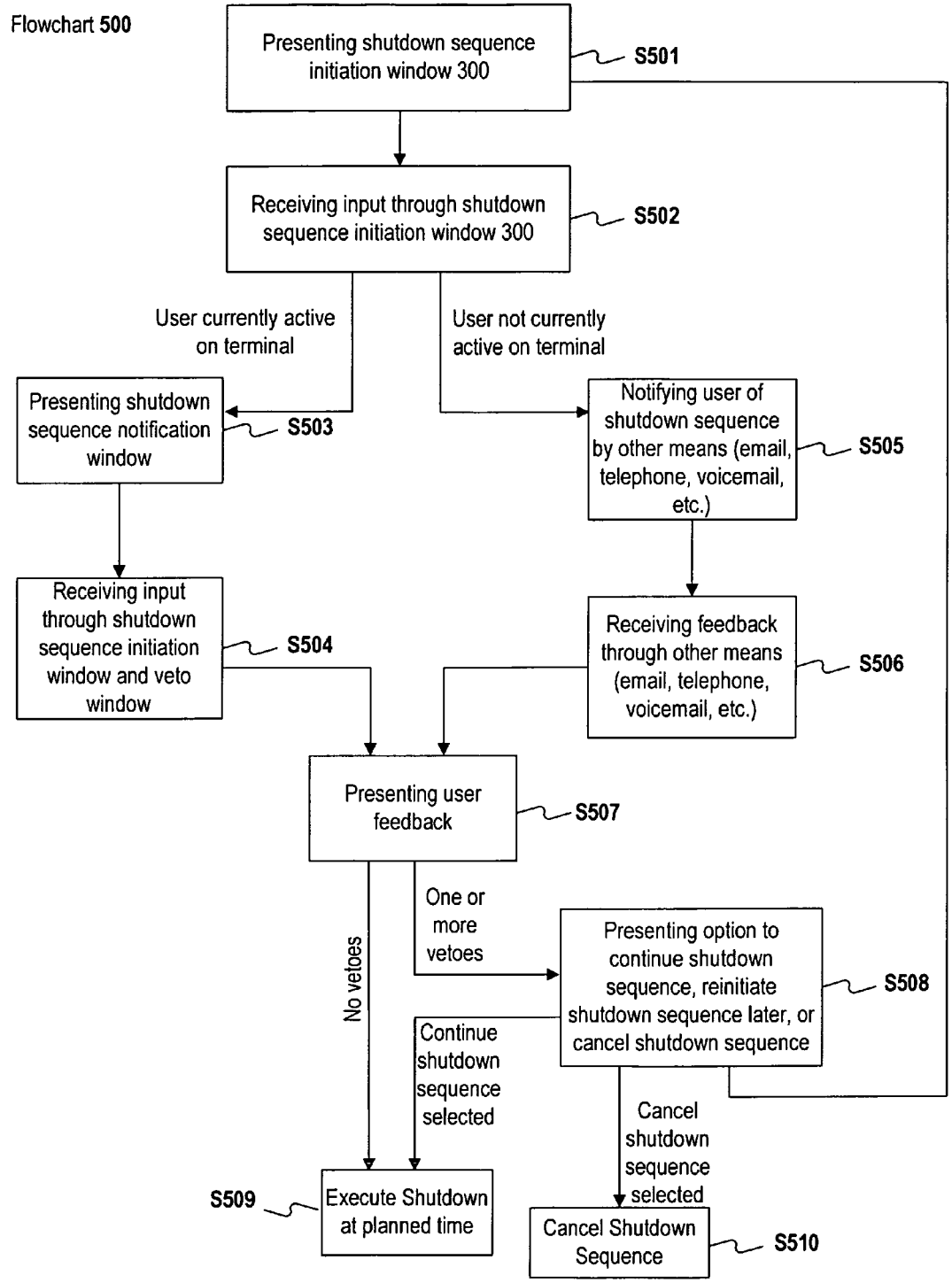
FIG. 5 illustrates an exemplary flowchart for describing detailed steps in a shutdown sequence consistent with certain aspects related to the present invention.

FIG. 5 is a more detailed exemplary flowchart 500 for a method consistent with the invention. FIG. 5 corresponds to a system action sequence that is a shutdown sequence. At step S501, administrator computer 102 responds to an input indicating that a shutdown sequence should be initiated. When administrator computer 102 receives such an input, it displays to the administrator a shutdown sequence initiation window 300 (displayed in FIG. 3).

At step S502, administrator computer 102 receives input about the shutdown sequence from the administrator through shutdown sequence initiation window 300. For example, the administrator can enter the reason for the shutdown in a shutdown justification field 301, and can enter the time for the shutdown in a shutdown time field 302. The administrator can also classify the severity of the shutdown by using one of three shutdown classification buttons 303, 304, and 305. The administrator can initiate the shutdown sequence by using an initiate shutdown sequence button 306. When the administrator uses initiate shutdown sequence button 306, messages are sent to user computers 101 about the shutdown sequence, including the information that was entered into shutdown sequence initiation window 300.

Figure 4:
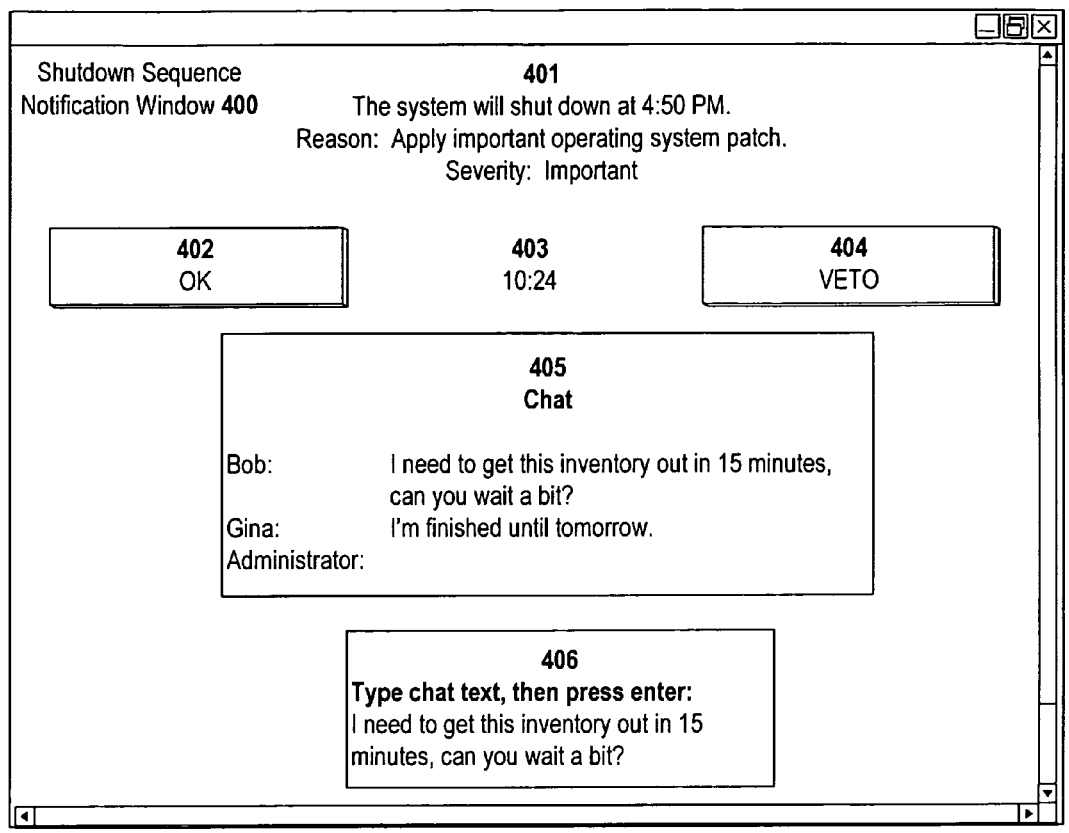
FIG. 4 illustrates a block diagram of an exemplary shutdown sequence notification window and a veto window consistent with certain aspects related to the present invention.
Figure 4:
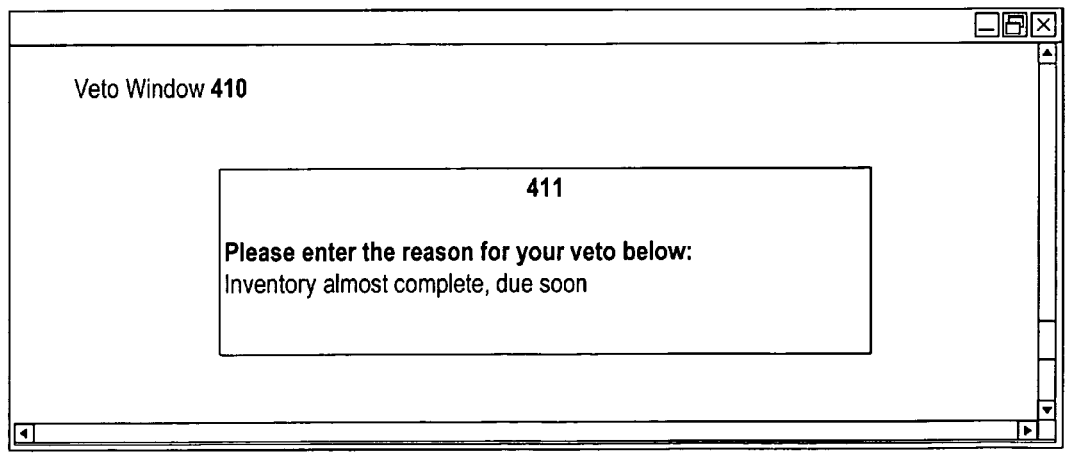

On user computers 101 where a user is presently logged in, the sequence continues to step S503. Here user computers 101 present a shutdown sequence notification window 400 to the user who is logged in, as shown in FIG. 4. Shutdown sequence notification window 400 presents the user with the system shutdown time, reason, and severity in a shutdown sequence information field 401, and presents the user with the remaining time until shutdown with a shutdown timer 403. If a user is logged in to multiple user computers 101 simultaneously, the system presents shutdown sequence notification window 400 on all of the computers the user is logged on to.

At step S504 (FIG. 5), user computers 101 receive input from users through shutdown sequence notification window 400. Users can communicate about the shutdown sequence with administrators or other users through a chat display field 405 and a chat text entry field 406. The user can choose to accept the shutdown sequence by pressing an OK button 402, or may signal their desire to veto the shutdown sequence by pressing a veto button 404. If the user presses veto button 404, a veto window 410 will be displayed, and the user will be requested to enter a reason for the veto. The user enters the reason for the veto in a veto reason entry field 411. In this description the term "veto" means simply voting on the shutdown sequence, however it is possible to give some users or computers the ability by the "veto" to prevent the shutdown sequence.

For users who are not logged in to a computer, the shutdown sequence continues from step S502 to step S505 (FIG. 2). Here either user computers 101 or administrator computer 102 notify such users of the shutdown sequence by some means. This notification can occur through email, telephone, fax, instant messenger, or other appropriate communication means.

At step S506, administrator computer 102 may receive feedback about the shutdown sequence through some other available means. For example, the user could respond via email, telephone, fax, instant messenger, or other communication means. Alternately the user could choose to log on to one of user computers 101 and use shutdown sequence notification window 400.

Figure 6:
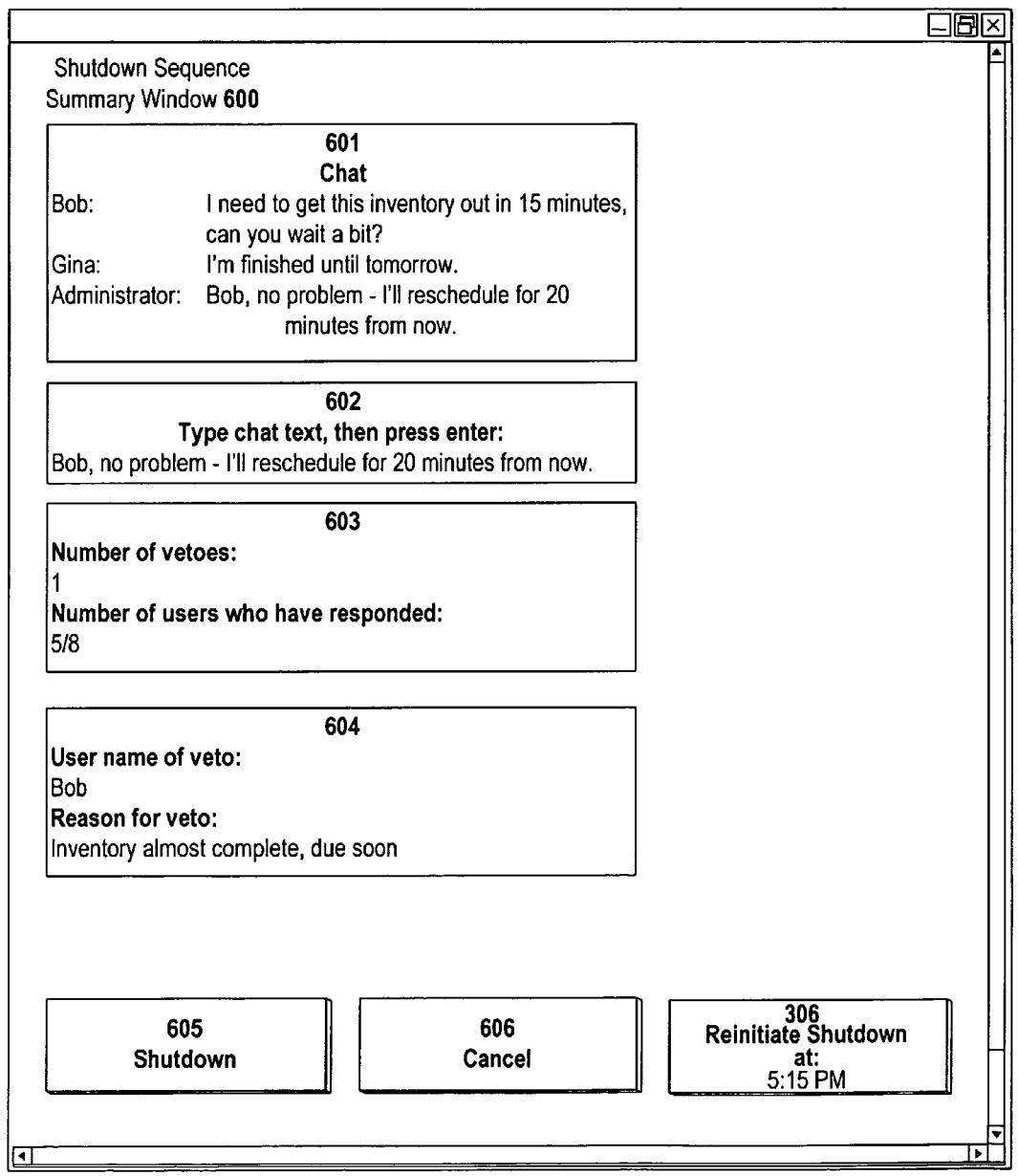
FIG. 6 illustrates a block diagram of an exemplary shutdown sequence summary window consistent with certain aspects related to the present invention.

At step S507, the user feedback is presented to the administrator. The feedback can be presented using a shutdown sequence summary window 600 as shown in FIG. 6. A chat display field 601 and a chat entry field 602 allow the administrator to interactively communicate with the users, who use corresponding chat fields 405 and 406 in shutdown sequence notification window 400 (FIG. 4). A veto summary field 603 displays the number of vetoes that have been received, and the number of users who have responded out of the total user computers 101 that are to be shut down. A veto reason display field 604 displays reasons users have entered in veto window 410. If vetoes have been received, processing goes to step S508. If no vetoes have been received during these steps, processing goes to step S509.

At step S508, administrator computer 102 presents the option of continuing with the shutdown sequence, reinitiating the shutdown sequence at a more convenient time, or canceling the shutdown sequence altogether, through shutdown sequence continue, cancel, and reinitiate buttons 605, 606, and 607 in shutdown sequence summary window 600 (FIG. 6). If shutdown sequence continue button 605 is pressed, processing goes to step S509. If shutdown sequence cancel button 606 is pressed, processing goes to step S510. If shutdown sequence reinitiate button 607 is pressed, processing goes to step S501.

At step S509, administrator computer 102 and user computers 101 execute the shutdown. The shutdown may include shutting down some or all of user computers 101 or administrator computer 102.

At step S510, the shutdown sequence is cancelled and the computers continue normal operation.

Methods consistent with the invention are readily extensible to the case where there are multiple administrators and administrator computers 102. In that case, if a first administrator initiates a shutdown sequence, then computers in use by the other administrators act in the manner previously described for user computers 101, and the computer for the administrator who initiates the shutdown acts as administrator computer 102. Similarly, administrators who do not initiate the shutdown sequence correspond to users in the previous description.

Methods consistent with the invention include distributing the processing in different ways than are described above. For example, user computers 101 can be used to receive feedback information or perform the continuing, canceling, or reinitiation of the shutdown sequence. Administrator computer 102 can be used to receive information about the shutdown sequence, or to transmit feedback about the shutdown sequence.

The method can be extended to have the administrator computer or user computers respond to vetoes without presenting the option to continue, cancel, or reinitiate the shutdown sequence. Instead, decision rules can be implemented by the administrator or user computers for how to deal with the results of the vetoes. For example, a threshold percentage or number of votes could be used to automatically trigger a cancellation or reinitiation of the shutdown sequence.

Figure 7:
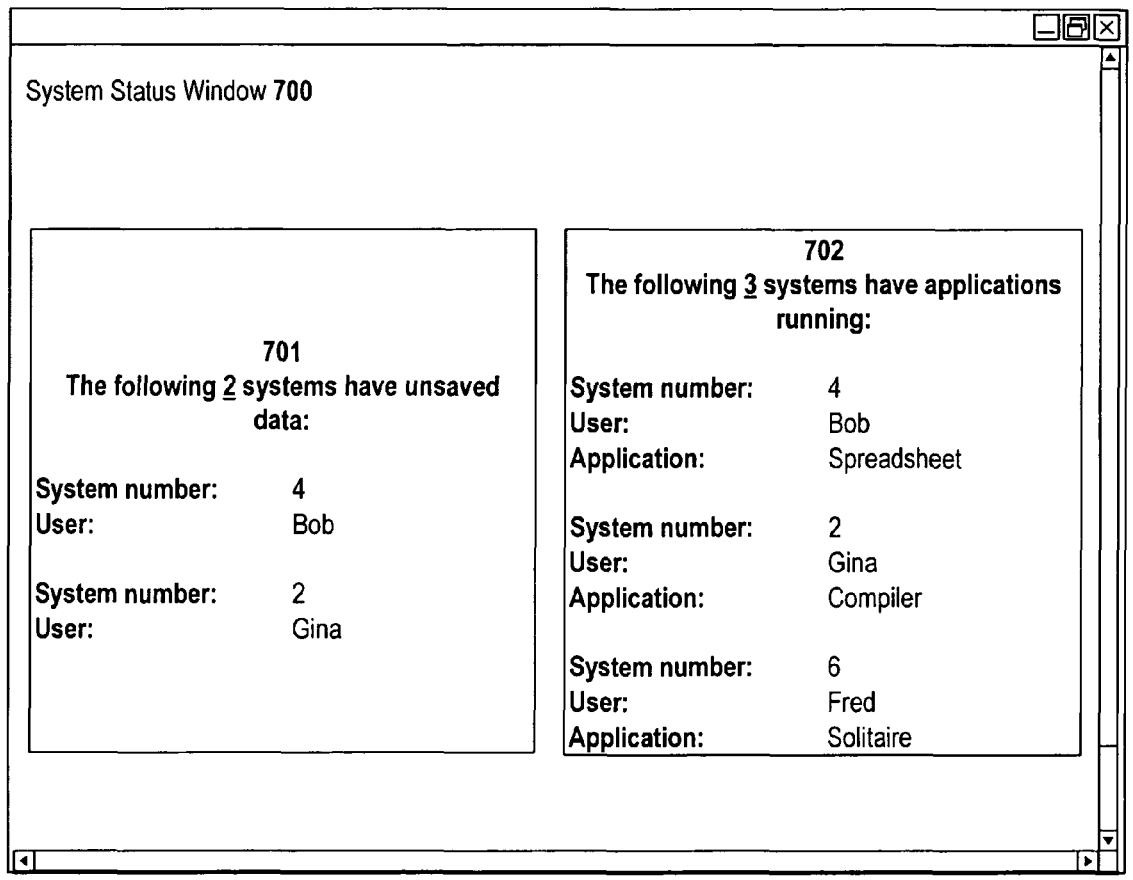
FIG. 7 illustrates a block diagram of an exemplary system status window consistent with certain aspects related to the present invention.

Administrator computer 102 can be configured to display a system status window 700 shown in FIG. 7, at any time during the shutdown sequence. System status window 700 displays information indicating which computers have unsaved data, in an unsaved data field 701, and displays information about applications still in use on other computers in an application status window 702. This information can be presented to the administrator along with the user feedback as factors in the administrator's decision to continue, cancel, or reinitiate the shutdown sequence.

It is also possible to prioritize the incoming veto messages to administrator computer 102. For example, inputs at user computers 101 could be used to prioritize a veto, vetoes could be prioritized by which user issued the veto, which computer issued the veto, or the status of the computer issuing the veto, such as having applications running on the computer or unsaved data on the computer. The veto priorities can be presented as additional information to consider in making the decision to continue the shutdown sequence, cancel the shutdown sequence, or reinitiate it at a later time. Some vetoes may have sufficiently high priority to prevent the shutdown sequence.

The method can be extended to help automate information delivery about decisions in a number of contexts. For example, the system disclosed above could be used not only for system shutdowns, but for introduction of changes that will make the system unusable for a period of time, or any other sort of system action that limits access to resources. Hardware or software updates are an example of this type of system action. Another example is a system action that will cause heavy network traffic, processor or memory loads, or unavailable peripheral devices such as printers or scanners. In this context, an administrator is defined as a person who has permission to make a computer to initiate a system action sequence.

Computer-readable media can be used to provide computer-readable instructions for performing a method consistent with the invention. User or administrator computers can be used to distribute the instructions so that other computers may perform steps consistent with the method.

The systems and methods disclosed herein may be embodied in various forms of apparatus including, for example, a data processor, such as a computer that also includes a database, digital electronic circuitry, memory, firmware, software, or in combinations of them. Moreover, the above-noted features, and other aspects and principles of the disclosed system and methods may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, that is, a computer program tangibly embodied in an information carrier. Such an information carrier may be embodied in a machine readable storage device or in a propagated signal, for execution by, or to control the operation of, data processing apparatus, e.g., a programmable processor, a computer, or multiple computers. A computer program can be written in any appropriate form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A method for managing system actions on a computer network that comprises a first computer and a plurality of second computers, the method comprising:

receiving at the first computer, via a shutdown sequence ignition window displayed by the first computer to an administrator who is logged in at the first computer, a command from the administrator to initiate a shutdown sequence whose completion results in a shutdown of the plurality of second computers, the administrator having permission to initiate the shutdown of the plurality of second computers;

initiating the shutdown sequence by the first computer in response to the command;

transmitting, by the first computer, shutdown sequence information for each of the plurality of second computers, the shutdown sequence information comprising a shutdown notification window for display to an active user at each of the second computers in active use, the reason, the time, the classification, and a notification for delivery by at least one of email or telephone to an inactive user of each of the second computers not in active use;

receiving, by the first computer for at least some of the plurality of second computers, feedback information responsive to the shutdown sequence information, the feedback information for each of the at least some of the plurality of second computers comprising an acceptance or a refusal of the shutdown sequence; and displaying, to the administrator by the first computer, the feedback information and at least one of unsaved data information indicating which of the plurality of second computers have unsaved data and application status information indicating applications still in use by one or more of the plurality of second computers; and selectively performing, by the first computer and based on the feedback information and the at least one of the unsaved data information and application status information, one of proceeding with the shutdown sequence, canceling the shutdown sequence, and reinitiating the shutdown sequence at a later time.

2. The method according to claim 1, wherein the feedback information comprises voting information.

3. The method according to claim 1, further comprising: exchanging the feedback information interactively between the first and second computers.

4. The method according to claim 1, wherein: the feedback information comprises voting information about the shutdown sequence that is received at the first computer for each of the plurality of second computers.

5. An apparatus for managing system actions on a computer network, the apparatus comprising:
 a first computer connected to a plurality of second computers by the computer network, the first computer comprising at least one programmable processor; and
 a computer-readable medium storing instructions that, when executed by the at least one programmable processor of the first computer, cause the first computer to perform operations comprising:
  receiving at the first computer, via a shutdown sequence ignition window displayed by the first computer to an administrator who is logged in at the first computer, a command from the administrator to initiate a shutdown sequence whose completion results in a shutdown of the plurality of second computers, the administrator having permission to initiate the shutdown of the plurality of second computers;
  initiating the shutdown sequence by the first computer in response to the command;
  transmitting, by the first computer, shutdown sequence information for each of the plurality of second computers, the shutdown sequence information comprising a shutdown notification window for display to an active user at each of the second computers in active use and a notification for delivery by at least one of email or telephone to an inactive user of each of the second computers not in active use;
  receiving, by the first computer for at least some of the plurality of second computers, feedback information responsive to the shutdown sequence information, the feedback information for each of the at least some of the plurality of second computers comprising an acceptance or a refusal of the shutdown sequence;
  displaying, to the administrator by the first computer, the feedback information and at least one of unsaved data information indicating which of the plurality of second computers have unsaved data and application status information indicating applications still in use by one or more of the plurality of second computers; and
  selectively performing, by the first computer and based on the feedback information and the at least one of the unsaved data information and application status information, one of proceeding with the shutdown sequence, canceling the shutdown sequence, and reinitiating the shutdown sequence at a later time.

6. The apparatus according to claim 5, wherein the feedback information comprises voting information.

7. The apparatus according to claim 5, wherein the first computer exchanges the feedback information interactively with the second computers.

8. The apparatus according to claim 5, wherein: the feedback information comprises voting information about the shutdown sequence that is received at the first computer for each of the plurality of second computers.

9. A non-transitory computer-readable storage medium containing instructions to configure a processor within a first computer to perform operations for managing system actions on a computer network that comprises the first computer and a plurality of second computers, the operations comprising:
 receiving at the first computer, via a shutdown sequence ignition window displayed by the first computer to an administrator who is logged in at the first computer, a command from the administrator to initiate a shutdown sequence whose completion results in a shutdown of the plurality of second computers, the administrator having permission to initiate the shutdown of the plurality of second computers;
 initiating the shutdown sequence by the first computer in response to the command;
 transmitting, by the first computer, shutdown sequence information for each of the plurality of second computers, the shutdown sequence information comprising a shutdown notification window for display to an active user at each of the second computers in active use and a notification for delivery by at least one of email or telephone to an inactive user of each of the second computers not in active use;
 receiving, by the first computer for at least some of the plurality of second computers, feedback information responsive to the shutdown sequence information, the feedback information for each of the at least some of the plurality of second computers comprising an acceptance or a refusal of the shutdown sequence;
 displaying, to the administrator by the first computer, the feedback information and at least one of unsaved data information indicating which of the plurality of second computers have unsaved data and application status information indicating applications still in use by one or more of the plurality of second computers; and
 selectively performing, by the first computer and based on the feedback information and the at least one of the unsaved data information and application status information, one of proceeding with the shutdown sequence, canceling the shutdown sequence, and reinitiating the shutdown sequence at a later time.

10. The medium according to claim 9, wherein the feedback information comprises voting information.

11. The method according to claim 9, wherein the medium contains instructions for exchanging feedback information interactively with the second computers.

12. The medium according to claim 9, wherein: the feedback information comprises voting information about the shutdown sequence that is received at the first computer for each of the plurality of second computers.

13. A non-transitory computer-readable storage medium containing instructions to configure a processor within a second computer to perform steps for implementing a method for managing system actions on a computer network, the method comprising:
receiving shutdown sequence information about a shutdown sequence from a first computer, the shutdown sequence information comprising a shutdown notification window for display on the second computer if a user of the second computer is in active use, and a notification for delivery by at least one of email or telephone to the user if the second computers not in active use, the shutdown sequence information having been sent by the first computer upon initiation by the first computer in response to a command received from an administrator who is logged in at the first computer and who has permission to initiate a shutdown of a plurality of other computers that comprises the second computer; and
transmitting feedback information responsive to the shutdown sequence information to the first computer, the feedback information comprising an acceptance or a refusal of the shutdown sequence that, upon receipt by the first computer, causes the first computer to selectively perform, based on the feedback information, other feedback information received for at least some of the plurality of other computers, and at least one of unsaved data information indicating which of the plurality of second computers have unsaved data and application status information indicating applications still in use by one or more of the plurality of second computers, one of proceeding with the shutdown sequence, canceling the shutdown sequence, and reinitiating the shutdown sequence at a later time.

14. The medium according to claim 13, wherein the medium contains instructions for exchanging feedback information interactively with the first computer.

15. The medium according to claim 13, wherein: the feedback information comprises voting information about the shutdown sequence that is received at the first computer for each of the plurality of second computers.

16. A non-transitory computer-readable storage medium containing instructions to configure a first computer to distribute instructions, wherein the distributed instructions relate to at least one step of a method for managing system actions on a network, the method comprising:
receiving at the first computer, via a shutdown sequence ignition window displayed by the first computer to an administrator who is logged in at the first computer, a command from the administrator to initiate a shutdown sequence whose completion results in a shutdown of the plurality of second computers, the administrator having permission to initiate the shutdown of the plurality of second computers;
initiating the shutdown sequence by the first computer in response to the command;
transmitting, by the first computer, shutdown sequence information for each of the plurality of second computers, the shutdown sequence information comprising a shutdown notification window for display to an active user at each of the second computers in active use and a notification for delivery by at least one of email or telephone to an inactive user of each of the second computers not in active use;
receiving, by the first computer for at least some of the plurality of second computers, feedback information responsive to the shutdown sequence information, the feedback information for each of the at least some of the plurality of second computers comprising an acceptance or a refusal of the shutdown sequence;
displaying, to the administrator by the first computer, the feedback information and at least one of unsaved data information indicating which of the plurality of second computers have unsaved data and application status information indicating applications still in use by one or more of the plurality of second computers; and
selectively performing, by the first computer and based on the feedback information and the at least one of the unsaved data information and application status information, one of proceeding with the shutdown sequence, canceling the shutdown sequence, and reinitiating the shutdown sequence at a later time.

17. The medium according to claim 16, wherein the feedback information comprises voting information.

18. The medium according to claim 16, wherein: the feedback information comprises voting information about the shutdown sequence that is received at the first computer for each of the plurality of second computers.

19. The method according to claim 1, wherein the receiving at the first computer via the shutdown sequence ignition window further comprises receiving a reason for initiating the shutdown sequence, a time at which the shutdown sequence is to be performed, and a classification of a severity of the reason for initiating the shutdown sequence, and wherein the shutdown sequence information comprises the reason, the time, and the classification.

20. A method comprising:
receiving, at a second computer, shutdown sequence information about a shutdown sequence from a first computer, the shutdown sequence information having been sent by the first computer upon initiation by the first computer in response to a command received from an administrator who is logged in at the first computer and who has permission to initiate a shutdown of a plurality of other computers that comprises the second computer;
displaying to a user at the second computer, if the user is in active user of the second computer, the shutdown sequence information via a shutdown notification window; the shutdown sequence information comprising a reason for initiating the shutdown sequence, a time at which the shutdown sequence is to be performed, and a classification of a severity of the reason for initiating the shutdown sequence;
receiving, from the user, an acceptance or a refusal of the shutdown sequence; and
transmitting, to the first computer form the second computer, feedback information responsive to the shutdown sequence information and at least one of unsaved data information indicating whether the second computer has unsaved data and application status information indicating whether at least one application remains in use by the second computer, the feedback information comprising the acceptance or the refusal, wherein the the first computer selectively performs, based on the feedback information and the at least one of the unsaved data information and application status information, one of proceeding with the shutdown sequence, canceling the shutdown sequence, and reinitiating the shutdown sequence at a later time.

* * * * *